US011345250B2

(12) United States Patent
Schwartz et al.

(10) Patent No.: US 11,345,250 B2
(45) Date of Patent: May 31, 2022

(54) SYSTEM FOR THE AUTOMATED DOCKING OF ROBOTIC PLATFORMS

(71) Applicant: Florida Power & Light Company, Juno Beach, FL (US)

(72) Inventors: Eric Schwartz, Juno Beach, FL (US); Stephen Cross, Juno Beach, FL (US); Michael Gilbertson, Juno Beach, FL (US); Kyle Bush, Juno Beach, FL (US); David Wendeborn, Portland, OR (US); Richard Armstrong, Portland, OR (US); Scott Nowicki, Portland, OR (US); Seth Hill, Portland, OR (US)

(73) Assignee: Florida Power & Light Company, Juno Beach, FL (US)

( * ) Notice: Subject to any disclaimer, the term of this patent is extended or adjusted under 35 U.S.C. 154(b) by 200 days.

(21) Appl. No.: 16/669,366

(22) Filed: Oct. 30, 2019

(65) Prior Publication Data

US 2020/0130523 A1 Apr. 30, 2020

Related U.S. Application Data

(60) Provisional application No. 62/752,970, filed on Oct. 30, 2018.

(51) Int. Cl.
*B60L 53/35* (2019.01)
*G05D 1/02* (2020.01)
(52) U.S. Cl.
CPC ............ *B60L 53/35* (2019.02); *G05D 1/0225* (2013.01); *B60L 2260/32* (2013.01)

(58) Field of Classification Search
CPC .. B60L 53/35; B60L 2260/32; B60L 2200/40; B60L 53/36; G05D 1/0225;
(Continued)

(56) References Cited

U.S. PATENT DOCUMENTS

| 8,387,193 B2 * | 3/2013 | Ziegler | ................ G05D 1/0219 15/50.1 |
| 8,452,450 B2 * | 5/2013 | Dooley | ................... B60L 53/14 700/258 |

(Continued)

OTHER PUBLICATIONS

Carlson et al., (Carlson),Modular Mobile Docking Station Design, Oct. 9-15, 2006, IEEE Proceedings, International Conference on Intelligent Robots and Systems, pp. 4722-4727 (Year: 2006).*

(Continued)

*Primary Examiner* — M Baye Diao
(74) *Attorney, Agent, or Firm* — Fleit Intellectual Property Law; Jon Gibbons

(57) ABSTRACT

Various embodiments are directed to a docking station for a robotic platform. The docking station may include a ramp having a first side and a second side opposing the first side, a base pad, a roller assembly, and a roller backstop assembly. The roller assembly may be coupled to the ramp and the base pad. The roller assembly may be configured to allow a robotic platform being driven towards the ramp to continue powered travel onto the ramp for docking when the robotic platform approaches the ramp within an angle range of 0 and 15 degrees with respect to either of the first and second sides of the ramp. The roller backstop assembly may be coupled to the roller assembly and the base pad. The roller backstop assembly may receive the robotic platform from the roller assembly to dock the robotic platform.

17 Claims, 6 Drawing Sheets

(58) Field of Classification Search
CPC ..... Y02T 90/12; Y02T 10/7072; Y02T 10/70; Y02P 90/60
USPC ........................................................ 320/109
See application file for complete search history.

(56) References Cited

U.S. PATENT DOCUMENTS

| | | | |
|---|---|---|---|
| 9,276,419 | B2 | 3/2016 | Borinato et al. |
| 10,183,563 | B2 * | 1/2019 | Rayner ................... B60K 1/04 |
| 10,575,696 | B2 * | 3/2020 | O'Brien ................ A47L 9/0477 |
| 2005/0156562 | A1 | 7/2005 | Cohen et al. |
| 2008/0028974 | A1 | 2/2008 | Bianco |
| 2009/0281661 | A1 * | 11/2009 | Dooley ................ G05D 1/0234 700/258 |
| 2012/0102670 | A1 | 5/2012 | Jang et al. |
| 2017/0072558 | A1 | 3/2017 | Reynolds et al. |
| 2018/0014709 | A1 * | 1/2018 | O'Brien ................ A47L 9/2884 |
| 2018/0188737 | A1 | 7/2018 | Won et al. |
| 2020/0133287 | A1 * | 4/2020 | Wendeborn .......... G05D 1/0225 |

OTHER PUBLICATIONS

Non-Final Office Action received for U.S. Appl. No. 16/130,989 dated Oct. 7, 2019, 12 pages.
Notice of Allowance received for U.S. Appl. No. 16/130,989 dated Jan. 30, 2020, 6 pages.

\* cited by examiner

SYSTEM FOR THE AUTOMATED DOCKING OF ROBOTIC PLATFORMS

CROSS REFERENCE TO RELATED APPLICATION

This application claims the benefit of U.S. Provisional Application No. 62/752,970, filed Oct. 30, 2018, the disclosure of which is incorporated, in its entirety, by this reference.

TECHNICAL FIELD

Embodiments of the disclosure relate generally to automating the docking of robotic platforms and more specifically to a docking station that facilitates the automated docking of robotic platforms for charging operations.

BACKGROUND

Infrastructure facilities such as electrical substations and water utility facilities frequently require on-site inspection for maintenance and repair operations associated with the failure of individual components due to natural corrosion over time, defects, event-induced equipment breakage and/or equipment overloading that may cause major disruption to operations, loss of revenue, and significant replacement costs. Advances in autonomous technology have resulted in the increasing use of wheeled robotic platforms to carry out inspection tasks previously performed manually.

Robotic platforms, in performing their assigned inspection tasks, have a need for replenishing their power source which is usually accomplished by programming the platforms to dock with a power source for charging. Traditionally, robotic platforms utilize various localization sensors (e.g., GPS, imaging, LiDAR and/or SONAR sources) in addition to complex software to initiate a docking sequence with a charging system. The aforementioned sensors and software however, have varying levels of precision that often result in the inaccurate docking of autonomous robotic platforms. This problem is further exacerbated when robotic platforms are utilized in outdoor environments where various environmental factors (e.g., mud, snow, rain, gravel, etc.) may cause further errors in localization based on the configuration of localization sensors for ideal (e.g., indoor) conditions. It is with respect to these considerations and others that the various embodiments of the present invention have been made.

SUMMARY

As will be described in greater detail below, the instant disclosure generally relates to a docking station for the docking of robotic platforms. In one example, the docking station may include (1) a ramp having a first side and a second side opposing the first side, (2) a base pad, (3) a roller assembly coupled to the ramp and the base pad, and (4) a roller backstop assembly coupled to the roller assembly and the base pad. The roller assembly may be configured to allow a robotic platform being driven towards the ramp to continue powered travel onto the ramp for docking when the robotic platform approaches the ramp within an angle range of 0 and 15 degrees with respect to either of the first and second sides of the ramp. The roller backstop assembly may receive the robotic platform from the roller assembly to dock the robotic platform.

In some examples, the roller assembly may include a first group of alignment members that (1) receives a set of wheels of the robotic platform as the robotic platform approaches the ramp and (2) aligns the wheels in a substantially forward direction of travel on the ramp when the wheels are received within the angle range of 0 and 15 degrees with respect to either of the first and second sides of the ramp. In some embodiments, each of the first group of alignment members may include a frame and a roller attached to the frame. In one example, the first group of alignment members may be oriented in a V-formation on the ramp. In some examples, the roller assembly may further include a second group of alignment members coupled to the first group of alignment members, the ramp, and the base pad, where the second group of alignment members (1) receives the wheels of the robotic platform from the first plurality of alignment members and (2) maintains the alignment of the wheels in the substantially forward direction of travel onto the base pad from the ramp for engagement with the roller backstop assembly.

In some embodiments, the roller backstop assembly may include a third group of alignment members and a stopping member, where the third group of alignment members may (1) receive the set of wheels of the robotic platform from the second group of alignment members on the base pad and (2) maintain the alignment of the wheels in the substantially forward direction of travel for engagement with the stopping member. In some embodiments, the stopping member may be oriented vertically relative to the base pad at a height greater than a radius of the wheels of the robotic platform such that further movement of the robotic platform is prevented.

In some examples, each of the third group of alignment members may include a frame and a roller attached to the frame. In some embodiments, the stopping member may include a roller. In some examples, the roller backstop assembly may include a docking arm assembly that docks the robotic platform. In some embodiments, the docking arm assembly may include a charge plate assembly that engages a receiver on the robotic platform to charge the robotic platform when the robotic platform is docked.

In some examples, the instant disclosure presents a system that includes a docking station and a robotic platform with at least one of the features described above. In one example, the system may include (1) a ramp having a first side and a second side opposing the first side, (2) a base pad, (3) a roller assembly coupled to the ramp and the base pad, and (4) a roller backstop assembly coupled to the roller assembly and the base pad. The roller assembly may be configured to allow a robotic platform being driven towards the ramp to continue powered travel onto the ramp for docking when the robotic platform approaches the ramp within an angle range of 0 and 15 degrees with respect to either of the first and second sides of the ramp. The roller backstop assembly may receive the robotic platform from the roller assembly to dock the robotic platform.

In some examples, the instant disclosure presents methods associated with assembling a docking station for the docking of robotic platforms. For example, a method may include (1) coupling a ramp having a first side and a second side opposing the first side to a base pad and a roller assembly, where the roller assembly is configured to allow a robotic platform being driven towards the ramp to continue powered travel onto the ramp for docking when the robotic platform approaches the ramp within an angle range of 0 and 15 degrees with respect to either of the first and second sides of the ramp and (2) coupling a roller backstop assembly to the base pad, where the roller backstop assembly receives he robotic platform from the roller assembly to dock the robotic platform.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

DETAILED DESCRIPTION

The present disclosure describes a mechanical system that allows a wheeled robotic platform to automatically and accurately dock in a docking station for charging operations when the robotic platform approaches a ramp of the docking station within a predetermined angle range. The embodiments of the disclosure described herein provide several advantages over traditional methods. By providing a configuration of a docking station ramp and a docking station roller assembly that enables a robotic platform being driven towards the docking station to continue powered travel into the docking station for accurate docking (e.g., engagement with a docking arm assembly) when approaching the docking station ramp within a predetermined angle range with respect to either side of the ramp, traditional positioning methods (e.g., utilizing electronic hardware and/or software means) that may often result in the erroneous docking of robotic platforms (e.g., due to the accuracy of localization sensors being affected by configuration and/or environmental factors) are no longer needed. Moreover, the components of the aforementioned mechanical system may be implemented at a lower cost than high-end electronic positioning hardware and software and is adaptable to nearly any type of wheeled robotic platform.

Embodiments of the disclosure now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
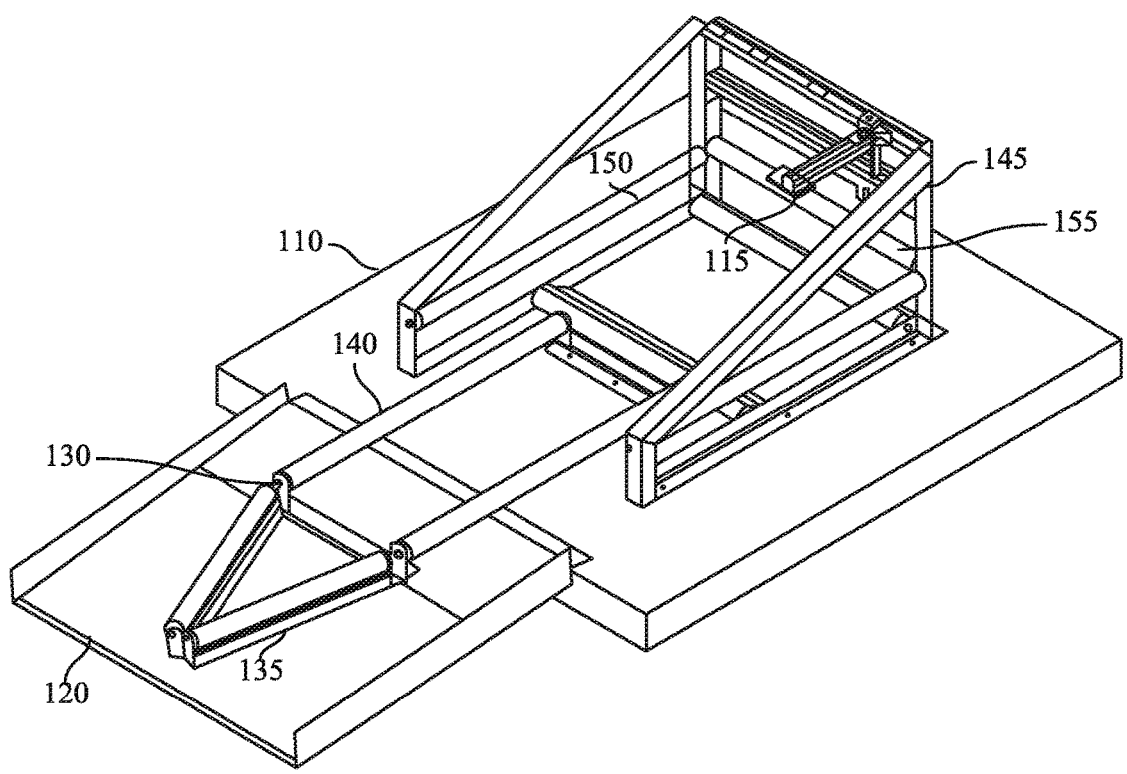
FIG. 1 illustrates a diagram showing a perspective view of an example docking station the docking of robotic platforms, according to an example embodiment.

FIG. 1 illustrates a diagram of an example docking station 100 for the docking of robotic platforms. In some examples, docking station 100 may include a base pad 110, a ramp 120, a roller assembly 130, and a roller backstop assembly 145.

In one embodiment, roller assembly 130 may be coupled to ramp 120 and base pad 110. Roller assembly 130 may include alignment members 135 coupled to alignment members 140. In some examples, alignment members 135 may be configured to receive a set of wheels of a robotic platform as the robotic platform approaches (i.e., when the wheels begin to make contact) with ramp 120 and further configured to align the wheels in a substantially forward direction of travel on ramp 120 when the wheels are received within an angle range of 0 and 15 degrees with respect to either side of ramp 120. In some examples, alignment members 135 may be arranged in a "V" formation to facilitate receiving the robotic platform wheels at an approach angle of between 0 and 15 degrees. In one embodiment, each of alignment members 135 may be a stainless-steel roller attached to a frame to prevent gripping when coming into contact with the robotic platform wheels. In other examples, alignment members 135 may be constructed of other materials having a low coefficient of friction including, without limitation, TEFLON coated plates, a collection of small stainless-steel bearing balls or beads, etc.

In some embodiments, alignment members 140 of roller assembly 130 may be configured to receive the robotic platform wheels from alignment members 135 and further configured to maintain the alignment of the robotic platform wheels in a substantially forward direction of travel onto base pad 110 from ramp 120 for engagement with roller backstop assembly 145. In some embodiments, each of alignment members 140 may be a stainless-steel roller attached to a frame to prevent gripping when coming into contact with the robotic platform wheels. In other examples, alignment members 140 may be constructed of other materials having a low coefficient of friction including, without limitation, TEFLON coated plates, a collection of small stainless-steel bearing balls or beads, etc. In one example, alignment members 140 may be coupled to the "wide" end of the V-shaped rollers making up alignment members 135 via a spring-loaded mechanism to allow for a degree of flex (e.g., bending) between the V-shaped rollers and the rollers making up the alignment members 140.

In some embodiments, roller backstop assembly 145 may include a frame having two sloped side members connected to a back member which together may form a cavity for receiving a robotic platform. The sloped side members may be connected by a horizontal roller coupled to base pad 110. The horizontal roller connecting the sloped side members may also be coupled to alignment members 140 of roller assembly 130. Each of the sloped side members of roller backstop assembly 145 may include alignment members 150 and a stopping member 155. In one example, alignment members 150 may be configured to receive the robotic platform wheels from alignment members 140 on base pad 110 and further configured to maintain the alignment of the robotic platform wheels in a substantially forward direction of travel for engagement with stopping member 155 so as to prevent further travel (i.e., movement) of the robotic platform wheels. In some examples, stopping member 155 may be vertically oriented relative to base pad 110 at a height greater than a radius of the robotic platform wheels. In some embodiments, each of alignment members 150 may be a stainless-steel roller attached to a frame to prevent gripping when coming into contact with the robotic platform wheels. In other examples, alignment members 150 may be constructed of other materials having a low coefficient of friction including, without limitation, TEFLON coated plates, a collection of small stainless-steel bearing balls or beads, etc. In one example, the stainless-steel rollers may be positioned at a height corresponding to approximately a midpoint of a wheel height of the robotic platform. In some examples, the rollers may assist in aligning and/or guiding the wheels of the robotic platform in a substantially forward direction as the robotic platform travels on base pad 110 for charging operations. Moreover, in some examples, stopping member 155 may also be a stainless-steel roller attached to a frame. In other examples, stopping member 155 may be constructed of other materials having a low coefficient of friction including, without limitation, TEFLON coated plates, a collection of small stainless-steel bearing balls or beads, etc. In one example, stopping member 155 may be positioned at a height corresponding to the top of a wheel height of the robotic platform. In some examples, stopping member 155 may assist in stopping the forward travel of a robotic platform on base pad 110 such that it may be accurately positioned for docking and/or engaging with a charging station for charging operations. For example, stopping member 155, upon coming in contact with a robotic platform, may provide a stopping force to prevent further travel of the robotic platform while will allowing rotation of its wheels.

In some embodiments, roller backstop assembly 145 may further include a docking arm assembly 115 for docking a robotic platform. In one example, docking arm assembly 115 may extend from the back member of roller backstop assembly 145 (thereby forming a "T") into the cavity formed by the sloped side members and the back member of roller backstop assembly 145. In some examples, docking arm assembly 115 may be constructed of 80-20 aluminum extrusion T-slot rail components. As will be described in greater detail below, docking arm assembly 115 may include or be coupled to a charge plate assembly that engages a receiver on the robotic platform for charging operations when the robotic platform is docked in docking station 100.

In some examples, base pad 110 may be coupled to roller backstop assembly 145 avia concrete anchors. In some examples, base pad 110 and ramp 120 may be constructed from sheets of ultra high molecular weight polyethylene (UHMW) thereby providing a robust low friction surface for the robotic platform to maneuver upon. For example, the low friction surface of base pad 110 and ramp 120 may allow the wheels on a skid steer robotic platform to slip laterally while roller assembly 130 the roller backstop assembly 145 align its wheels to maneuver into the cavity formed by roller backstop assembly 145 until the robotic platform reaches stopping member 155 such that its charging receiver is positioned to contact with a charge plate assembly coupled to docking arm assembly 115.

Figure 2:
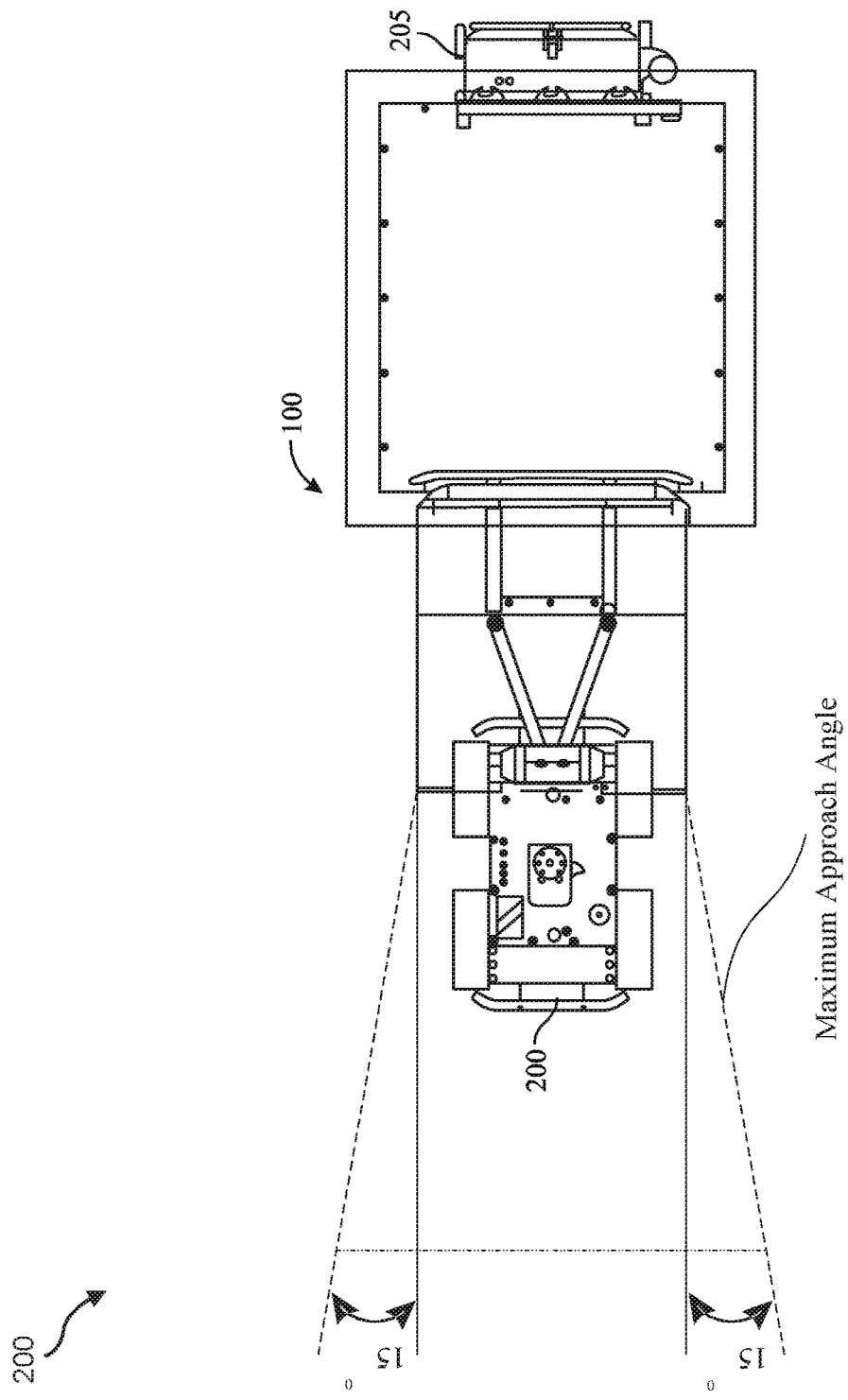
FIG. 2 illustrates a diagram showing a top view of an example system for the docking of robotic platforms, according to an example embodiment.

FIG. 2 illustrates a diagram of a top view of an example system 200 for the docking of robotic platforms, according to an example embodiment. As shown in FIG. 2, system 200 may include a robotic platform 205 and docking station 100 (described in detail above with respect to FIG. 1). As discussed above, the alignment members of the roller assembly (e.g., alignment members 135 of roller assembly 130 in FIG. 1) may be configured to receive a set of wheels of robotic platform 205 as robotic platform 205 approaches (i.e., when the wheels begin to make contact) with the ramp of docking station 100 and further configured to align the wheels in a substantially forward direction of travel on the ramp when the wheels are received within an angle range of 0 and 15 degrees (with 15 degrees being the maximum approach angle) with respect to either side of the ramp. After robotic platform 205 has been received in docking station 100, robotic platform 205 may be docked and further (while docked) engage in charging operations with power being supplied by a power station 210 coupled to docking station 100. In some examples, power station 210 may include one or more direct current (DC) power supplies enclosed in a charging assembly enclosure coupled to the back of docking station 100. In some embodiments (as shown in FIG. 2), docking station 100 may further include a housing coupled to the roller backstop assembly and the base pad that may be utilized to cover robotic platform 205 when docked.

Figure 3:
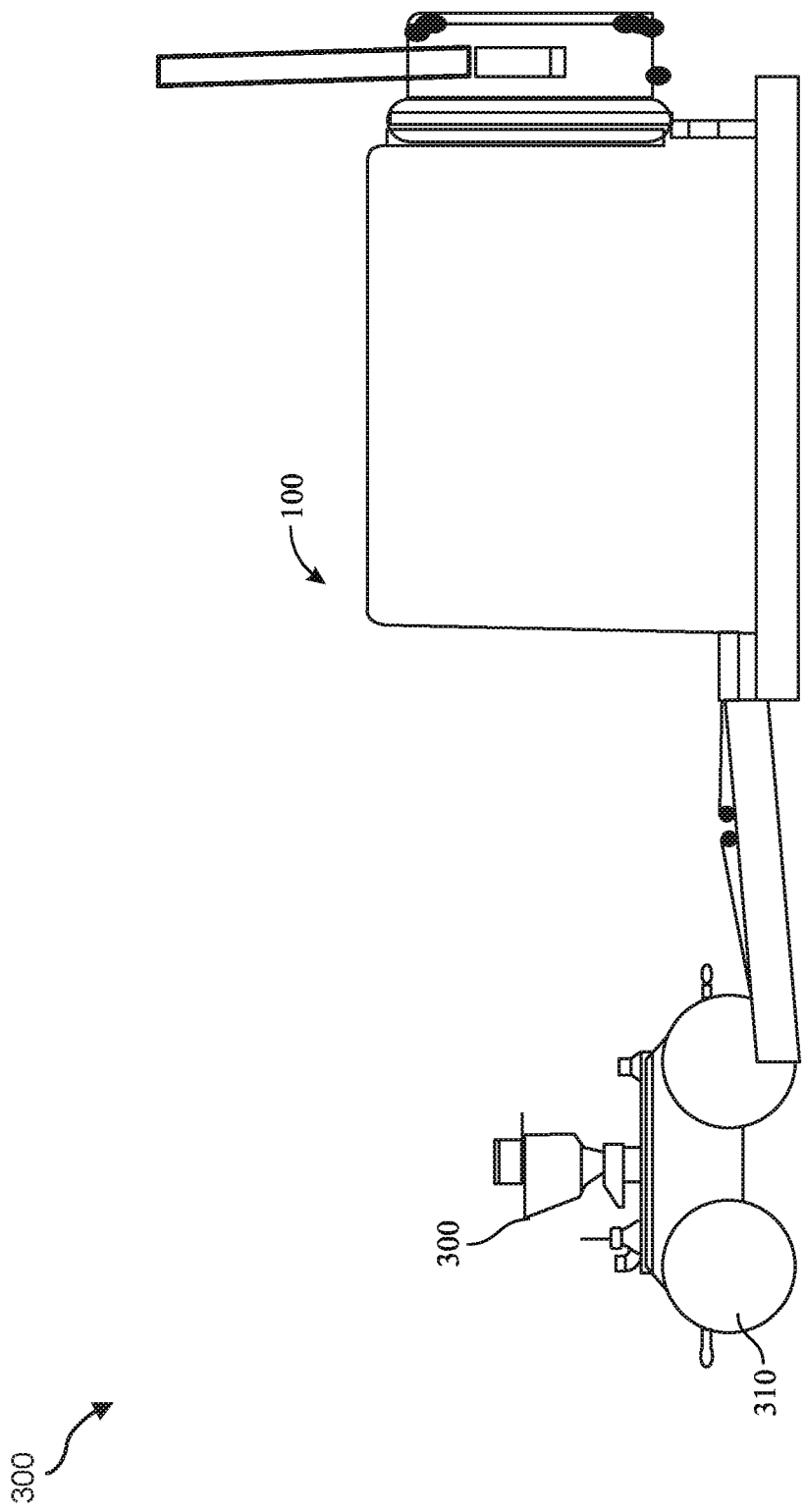
FIG. 3 illustrates a diagram showing a side view of an example system for the docking of robotic platforms, according to an example embodiment.

FIG. 3 illustrates a diagram of a side view of an example system 300 for the docking of robotic platforms, according to an example embodiment. As shown in FIG. 3, system 300 may include a robotic platform 305 and docking station 100 (described in detail above with respect to FIGS. 1 and 2). As discussed above, the alignment members of the roller assembly (e.g., alignment members 135 of roller assembly 130 in FIG. 1) may be configured to receive a set of wheels 310 of robotic platform 305 as robotic platform 305 approaches (i.e., when the wheels begin to make contact) with the ramp of docking station 100 and further configured to align the wheels in a substantially forward direction of travel on the ramp when the wheels are received within an angle range of 0 and 15 degrees (with 15 degrees being the maximum approach angle) with respect to either side of the ramp. After robotic platform 305 has been received in docking station 100, robotic platform 305 may be docked.

Figure 4:
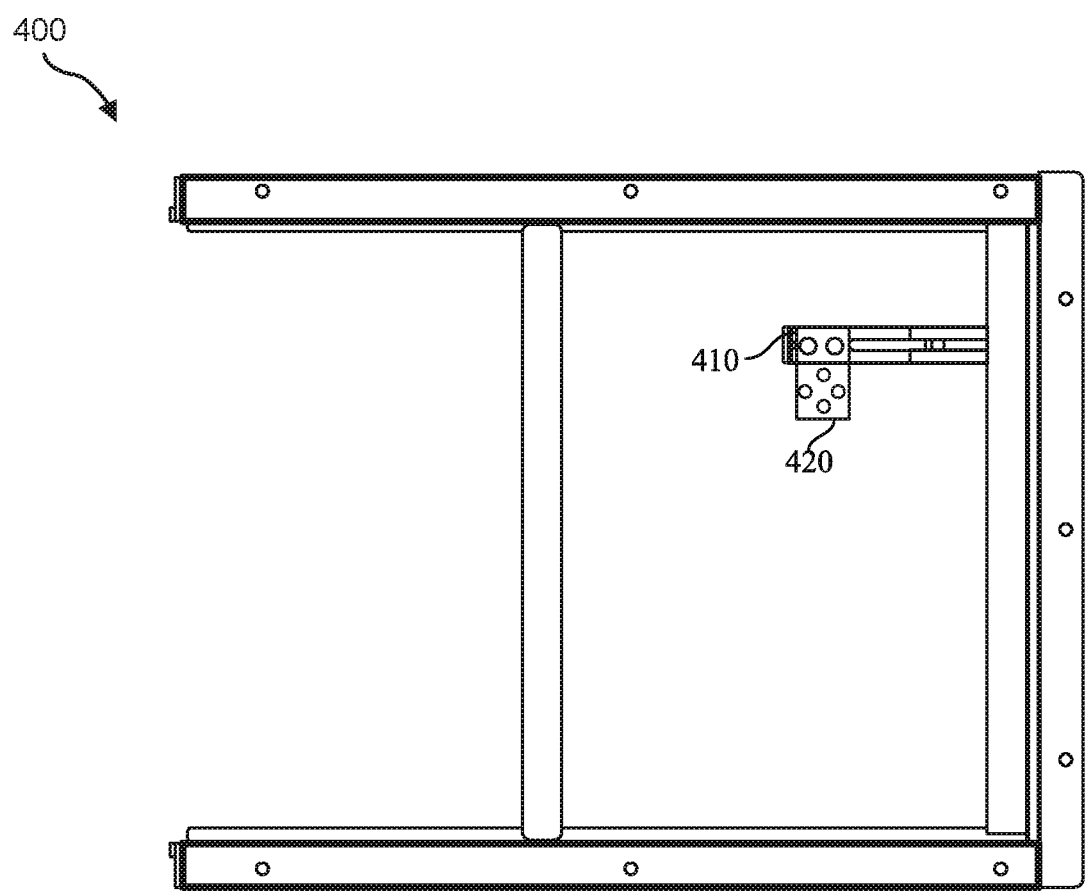
FIG. 4 illustrates a diagram showing a top view of an example docking station for the docking of robotic platforms, according to an example embodiment.
Figure 5:
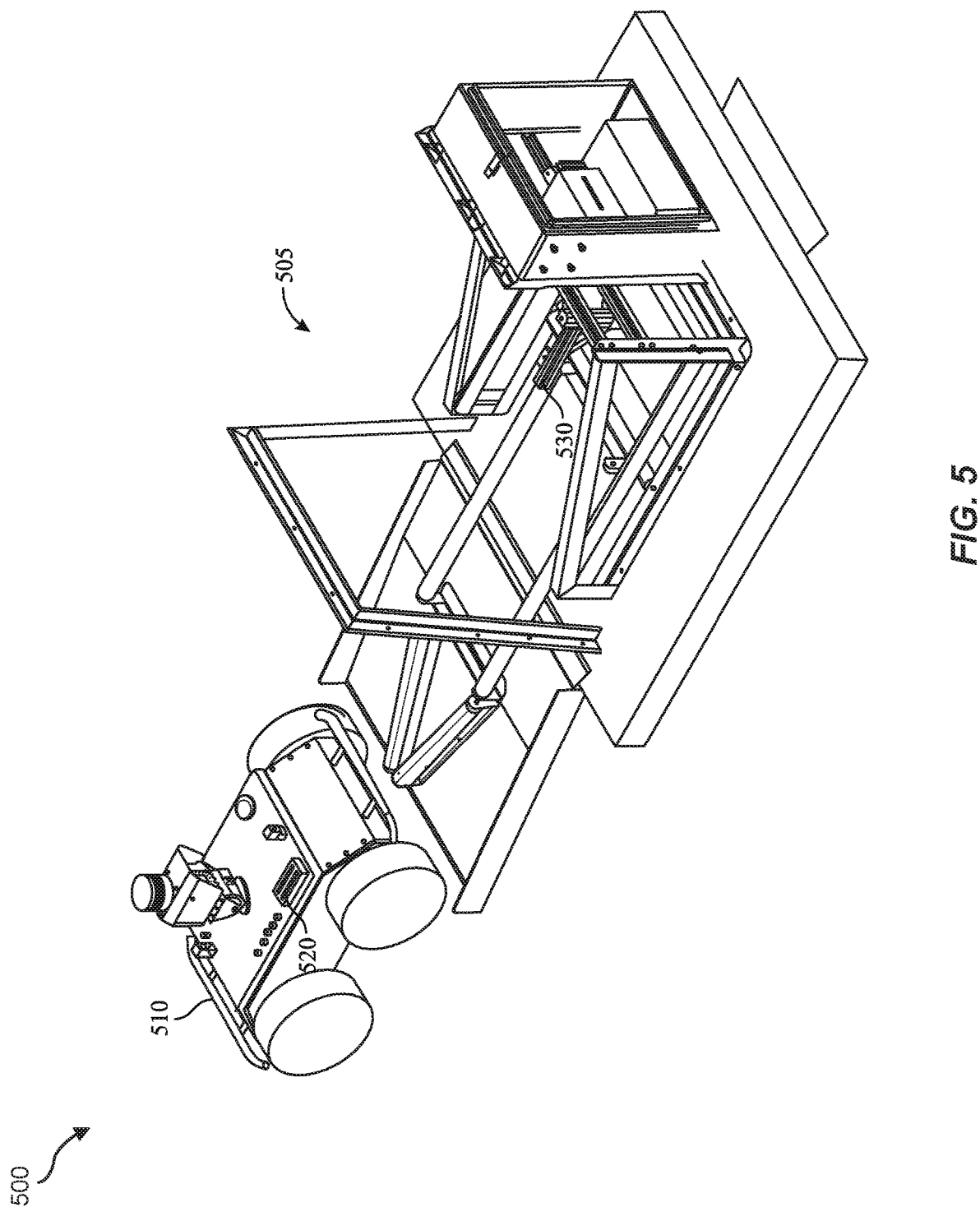
FIG. 5 illustrates a diagram showing a perspective view of an example system for the docking of robotic platforms, according to an example embodiment.
Figure 6:
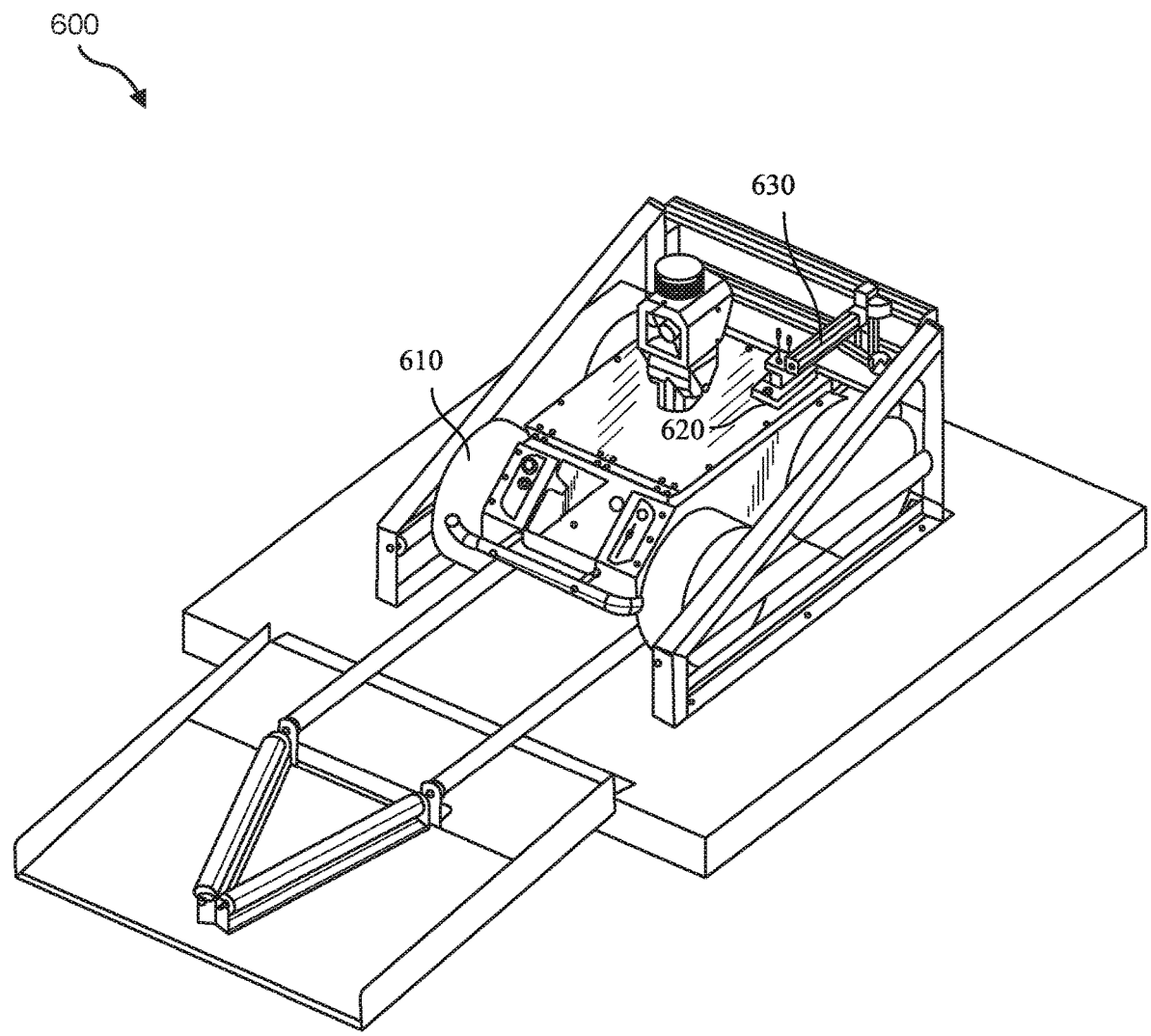
FIG. 6 illustrates a diagram showing another perspective view of an example system for the docking of robotic platforms, according to an example embodiment.

FIG. 4 illustrates a diagram of a top view of an example docking station 400 for the docking of robotic platforms, according to an example embodiment. As shown in FIG. 4, docking station 400 may include a docking arm assembly 410 utilized to dock a robotic platform for charging operations. In some examples, docking arm assembly 410 may include (or be coupled to) a charge plate assembly 420. In some examples, charge plate assembly 420 may be configured to engage with a charging receiver on a robotic platform when the robotic platform is docked inside of docking station 400. For example, and turning now to FIG. 5, a system 500 is shown that includes a robotic platform 510 with a charging receiver 520 for charging robotic platform 510 when it is docked via docking arm assembly 530 in a docking station 505. As a further example, and turning now to FIG. 6, a system 600 is shown that includes a robotic platform 610 docked inside of a docking station 605. In this example, a charging receiver 620 on robotic platform 610 may be engaged with a docking arm assembly 630 in docking station 605. In some examples, docking arm assembly 630 may include or be coupled to a charge plate assembly that may be electrically connected to a power station (e.g., power station 210 of FIG. 2) for providing power to robotic platform 610 via charging receiver 620. In some examples, the power station may include one or more DC power supplies enclosed in a charging assembly enclosure coupled to the back of docking station 605 and electrically connected to the charge plate assembly.

The term "robotic platform" as used herein, generally refers to any form of machine, programmable by a computer, capable of autonomously or semi-autonomously carrying out a complex series of actions or tasks such as facility inspections. Examples of programmable mobile machines include, without limitation, robots, aquatic mobility systems (e.g., autonomous surface vehicles), and/or surface-based mobility systems (e.g., unmanned ground vehicles (UGVs) including autonomous cars, etc.) that are capable of directional movement on the ground or on water.

The robotic platforms disclosed herein may be utilized in a variety of environments and conditions, including, for example facility substations (e.g., electrical and/or water utility substations), data centers, industrial environments (e.g., factories, plants, etc.), warehouses (e.g., storage warehouses, shipping warehouses, etc.), construction sites, buildings, outdoor spaces, and/or any other suitable environment or location, without limitation.

In some embodiments, a method for manufacturing, assembling, using, adjusting, or otherwise configuring or creating the docking station systems described herein may include (1) coupling a ramp to a base pad utilizing a roller assembly, where the ramp and the roller assembly are configured to allow a robotic platform being driven towards the ramp to continue powered travel onto the ramp for docking when the robotic platform approaches the ramp within an angle range of 0 and 15 degrees with respect to either side of the ramp, (2) coupling a roller backstop assembly to the base pad, where the roller backstop assembly includes multiple rollers and a docking arm assembly, the docking arm assembly including a charge plate assembly for engaging a receiver on the robotic platform for docking and charging of the robotic platform, and (3) coupling a housing to the roller backstop assembly and the base pad for covering the robotic platform when the receiver of the robotic platform is engaged with the charge plate assembly of the docking arm assembly (i.e., docked).

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A docking station for a robotic platform comprising:
   a ramp having a first side and a second side opposing the first side;
   a base pad;
   a roller assembly coupled to the ramp and the base pad, wherein the roller assembly is configured to allow a robotic platform being driven towards the ramp to continue powered travel onto the ramp for docking when the robotic platform approaches the ramp within an angle range of 0 and 15 degrees with respect to either of the first and second sides of the ramp, and wherein the roller assembly comprises a first plurality of alignment numbers that,
   receives a set of wheels of the robotic platform as the robotic platform approaches the ramp; and
   aligns the wheels in a substantially forward direction of travel on the tamp when the wheels are received within the angle range of 0 and 15 degrees with respect to either of the first and second sides of the ramp; and
   a roller backstop assembly coupled to the roller assembly and the base pad, wherein the roller backstop assembly receives the robotic platform from the roller assembly to dock the robotic platform.

2. The docking station of claim 1, wherein each of the first plurality of alignment members comprises a frame and a roller attached to the frame.

3. The docking station of claim 1, wherein the first plurality of alignment members are oriented in a V-formation on the ramp.

4. The docking station of claim 1, wherein the roller assembly further comprises a second plurality of alignment members coupled to the first plurality of alignment members, the ramp, and the base pad, wherein the second plurality of alignment members:
   receives the wheels of the robotic platform from the first plurality of alignment members; and
   maintains the alignment of the wheels in the substantially forward direction of travel onto the base pad from the ramp for engagement with the roller backstop assembly.

5. The docking station of claim 4, wherein the roller backstop assembly comprises a third plurality of alignment members and a stopping member, wherein the third plurality of alignment members:
   receives the set of wheels of the robotic platform from the second plurality of alignment members on the base pad; and
   maintains the alignment of the wheels in the substantially forward direction of travel for engagement with the stopping member, wherein the stopping member is oriented vertically relative to the base pad at a height greater than a radius of the wheels of the robotic platform, and wherein the stopping member prevents further movement of the robotic platform.

6. The docking station of claim 5, wherein each of the third plurality of alignment members comprises a frame and a roller attached to the frame.

7. The docking station of claim 5, wherein the stopping member comprises a roller.

8. The docking station of claim 1, wherein the roller backstop assembly comprises a docking arm assembly that docks the robotic platform.

9. The docking station of claim 8, wherein the docking arm assembly comprises a charge plate assembly that engages a receiver on the robotic platform to charge the robotic platform when the robotic platform is docked.

10. A system comprising:
    a robotic platform; and
    a docking station, wherein the docking station comprises:
      a ramp having a first side and a second side opposing the first side;
      a base pad;
      a roller assembly coupled to the ramp and the base pad, wherein the roller assembly is configured to allow the robotic platform, when the robotic platform is driven towards the ramp, to continue powered travel onto the ramp for docking when the robotic platform approaches the ramp within an angle range of 0 and IS degrees with respect to either of the first and second sides of the ramp, wherein the roller assembly comprises a first plurality of alignment members that;
      receives a set of wheels of the robotic platform as the robotic platform approaches the ramp; and aligns the wheels in a substantially forward direction of travel on the ramp when the wheels are received within the angle range of 0 and 15 degrees with respect to either of the first and second sides of the ramp; and a roller backstop assembly coupled to the roller assembly and the base pad, wherein the roller backstop assembly receives the robotic platform from the roller assembly to dock the robotic platform.

11. The system of claim 10, wherein the first plurality of alignment members are oriented in a V-formation on the ramp.

12. The system of claim 10, wherein the roller assembly further comprises a second plurality of alignment members coupled to the first plurality of alignment members, the ramp, and the base pad, wherein the second plurality of alignment members:

receives the wheels of the robotic platform from the first plurality of alignment members; and maintains the alignment of the wheels in the substantially forward direction of travel onto the base pad from the ramp for engagement with the roller backstop assembly.

13. The system of claim 12, wherein the roller backstop assembly comprises a third plurality of alignment members and a stopping member, wherein the third plurality of alignment members:

receives the set of wheels of the robotic platform from the second plurality of alignment members on the base pad; and maintains the alignment of the wheels in the substantially forward direction of travel for engagement with the stopping member, wherein the stopping member is oriented vertically relative to the base pad at a height greater than a radius of the wheels of the robotic platform, and wherein the stopping member prevents further movement of the robotic platform.

14. The system of claim 13, wherein each of the third plurality of alignment members comprises a frame and a roller attached to the frame.

15. The system of claim 13, wherein the stopping member comprises a roller.

16. The system of claim 10, wherein each of the first plurality of alignment members comprises a frame and a roller attached to the frame.

17. The system of claim 10, wherein the roller backstop assembly comprises a docking arm assembly that docks the robotic platform.

* * * * *